Nov. 9, 1948.                    J. C. HARBISON                    2,453,315
                          MILLING ATTACHMENT FOR LATHES
Filed Jan. 17, 1946                                           2 Sheets-Sheet 1

INVENTOR:
JOSEPH C. HARBISON
By Carr, Carr, Grimaldy,
HIS ATTORNEYS.

Nov. 9, 1948.  J. C. HARBISON  2,453,315
MILLING ATTACHMENT FOR LATHES
Filed Jan. 17, 1946  2 Sheets-Sheet 2
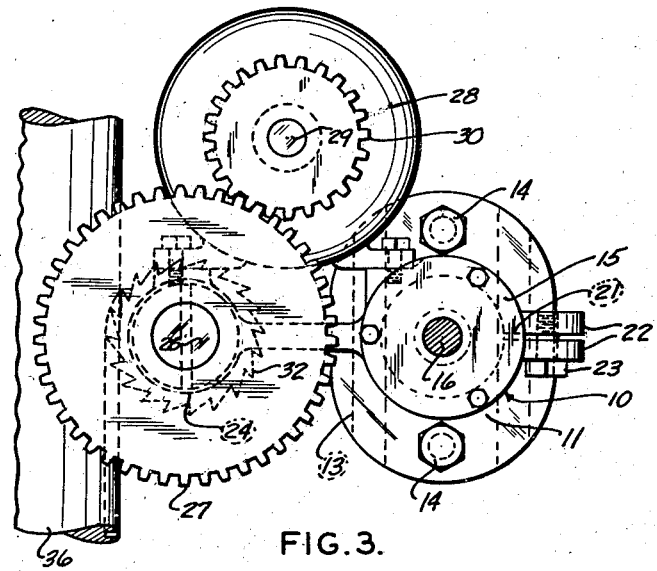
FIG. 3.
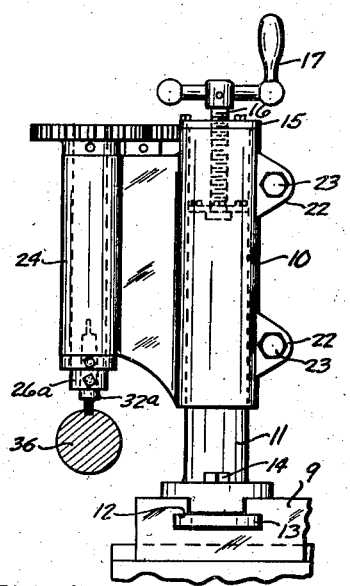
FIG. 4.
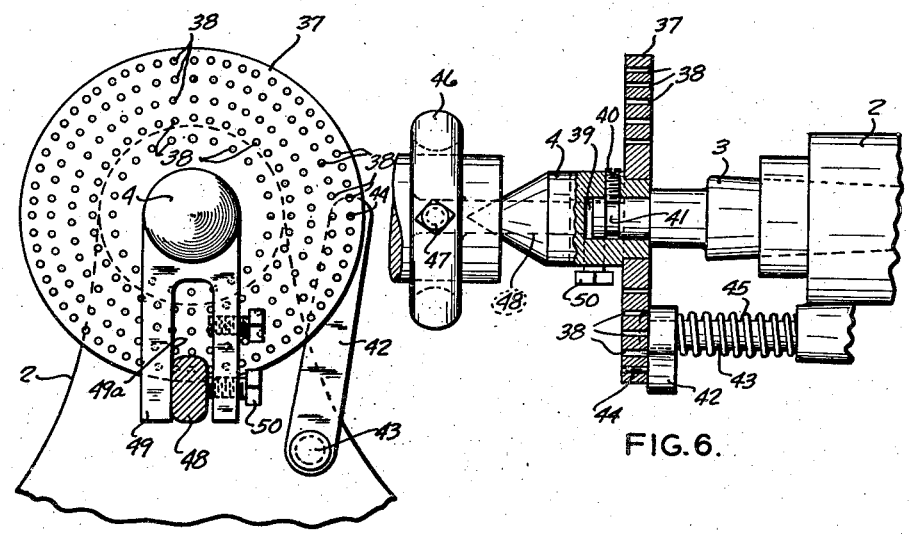
FIG. 5.
FIG. 6.
INVENTOR:
JOSEPH C. HARBISON
By Carr, Carr & Gravely,
HIS ATTORNEYS.

Patented Nov. 9, 1948

2,453,315

UNITED STATES PATENT OFFICE 2,453,315

MILLING ATTACHMENT FOR LATHES

Joseph C. Harbison, Eldorado, Ill., assignor of forty-three and one-third per cent to Obe Roberts, Eldorado, Ill.

Application January 17, 1946, Serial No. 641,783

1 Claim. (Cl. 90—16)

This invention relates to milling attachments for lathes. It has for its principal object to devise a simple, efficient and relatively inexpensive attachment of the above type which is self-operated and can be quickly and easily attached to and removed from the lathe as a complete preassembled unit. Other objects are to provide for adjusting the attachment for milling blind or continuous key slots and spur or beveled gears. Another object is to provide for adjusting the work through aliquot parts of a circumference and for locking the work in the desired position of rotary adjustment. The invention consists in the milling attachment and in the construction, combinations and arrangements of parts hereinafter described and claimed.

Figure 1:
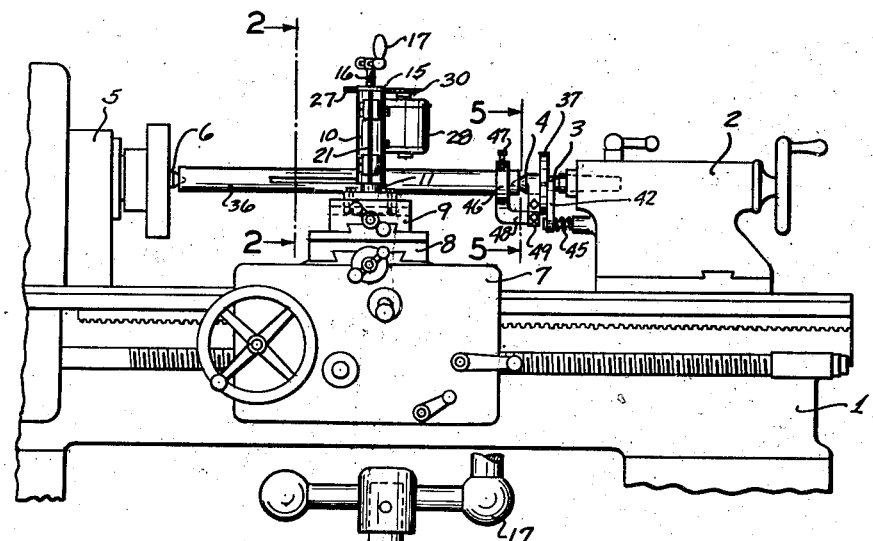
Figure 2:
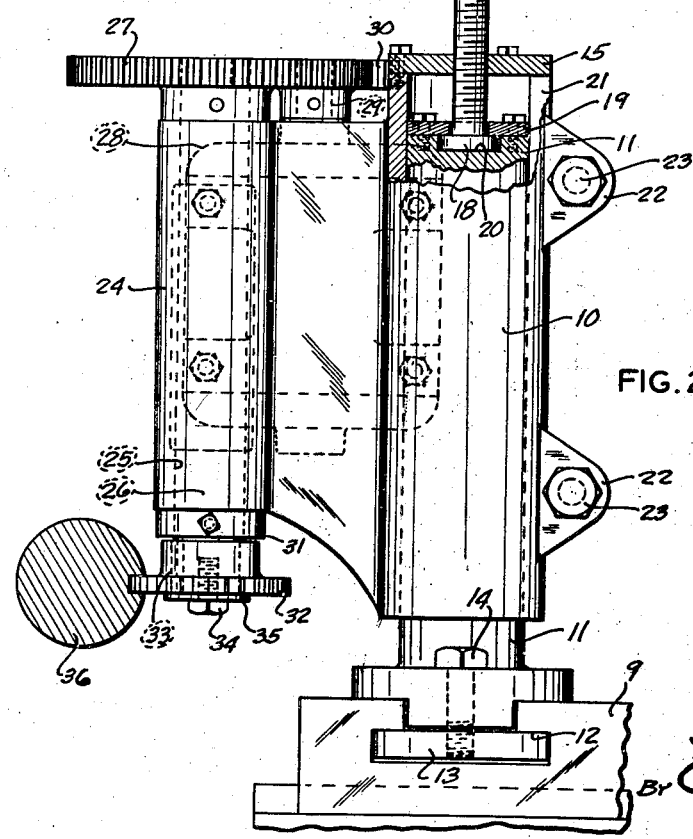

In the accompanying drawings, which form part of this specification and wherein like symbols refer to like parts wherever they occur, Fig. 1 is a front elevational view of a portion of an engine lathe provided with a milling attachment embodying my invention, Fig. 2 is an enlarged vertical cross-sectional view on the line 2—2 in Fig. 1, Fig. 3 is a top plan view of the parts shown in Fig. 2, Fig. 4 is a view similar to Fig. 2, showing an attachment provided with an end mill for finishing the end of a blind key slot, Fig. 5 is an enlarged vertical cross-sectional view on the line 5—5 in Fig. 1; and Fig. 6 is a plan view of the work indexing and locking mechanism, with the indexing disk and a portion of the tailstock center shown in horizontal section.

In the accompanying drawings, my invention is shown in connection with an ordinary engine lathe comprising a bed 1, a tailstock 2 provided with a dead spindle 3 and a lather center 4, a headstock 5 provided with a lathe center 6, a carriage 7 slidable on said bed between the head and tailstocks, a cross-slide 8 on said carriage, and a compound slide rest or auxiliary slide 9 on said cross-slide. This construction of lathe is well known and it is considered unnecessary to illustrate it in detail.

My milling attachment comprises an upright hollow cylinder 10 which is mounted for vertical sliding movement on a tool post 11 whose base portion is supported in a T-shaped slideway 12 in the compound rest slide 9 and is locked in said slideway by means of the usual clamping plate 13 and screws 14. The cylinder 10 is closed at its upper end by means of a plate 16, and a screw 16 is threaded through said plate axially of said cylinder and is provided with an operating handle 17 at its exposed upper end and has a rotary but nonaxially slidable connection at its lower end with the upper end of the tool post 11. This connection comprises a collar 18 rigid with the lower end of the operating screw 16 and an annular retaining plate 19 fixed to the upper end of the tool post 11 for holding said head in a central recess 20 in the top of said post. By this arrangement, the cylinder 10 may be raised and lowered on the tool post 11 by turning the vertical adjusting screw 16; and it also may be rotated on said post in any desired position of its vertical adjustment. The cylinder is split, as at 21, and has one or more pairs of outstanding lugs 22 located one on each side of said split adapted to receive screws 23, whereby said cylinder may be clamped to the tool post 11 in any desired position of rotary or vertical adjustment thereon.

Projecting laterally from one side of the hollow cylindrical body 10 of the attachment is a portion 24 having a vertical bore 25 therethrough adapted to rotatably receive a shaft 26 having a gear 27 fixed to the upper end thereof. The gear 27 is preferably driven by an electric motor 28 that is bolted to one side of the radially projecting portion 24 of the hollow cylinder 10. The motor is arranged with its armature shaft 29 disposed vertically; and a pinion 30 is fixed to the upper end of said armature shaft and meshes with the gear 27 for driving the same. The vertical motor driven shaft or arbor 26 of the attachment is held in the bore 25 provided therefor in the lateral extension 24 of the cylinder 10 preferably by means of the hub of the gear 27 on the upper end of said shaft and by means of a collar 31 fixed to the lower portion of said shaft in abutting relation to the under side of said extension. A milling cutter 32 is removably secured to the lower end of the arbor 26 for rotation therewith preferably by means of a key 33 and is held on said arbor by means of a cap screw 34 which extends through a washer 35 and is threaded axially into the lower end of said arbor.

By the arrangement described, the milling attachment may be readily mounted on the compound rest slide 9 by clamping the tool post 11 in the slideway 12 in said slide. When it is desired to mill a longitudinal groove or key slot in a cylindrical work piece or shaft 36, the work piece or shaft is non-rotatably supported between the tail and headstock centers 4 and 6, respectively, and the attachment is rotatably and vertically adjusted on the tool post 11 to bring the milling cutter 32 into engagement with one side of the work along a diameter passing horizontally therethrough. The key slot is then cut in the work by moving the carriage 7 longitudinally thereof, the depth of the cut is regulated by adjusting the cross-slide 8. The cylinder 10 is locked to the post 11 in the desired position of vertical and rotary adjustment relative thereto by tightening the clamping screws 23. The attachment may be made to produce either spur or beveled gears by changing the angular adjustment of the compound rest slide 9. As shown in Fig. 4, the end portions of blind key slots may be finished by substituting for the arbor 26 an arbor 26a having an end mill 32a mounted in the lower end thereof and by adjusting the attachment so that said end mill is located above the work on a vertical diameter thereof.

As shown in the drawings, indexing means is provided for rotatably adjusting the work to produce a regular series of teeth or grooves therein and for holding the work in the desired position of rotary adjustment. This means preferably comprises an indexing disk 37 which is rigidly fixed to the tailstock center 4 and is provided with concentric circles of holes 38 with a slightly different spacing of the holes in each circle. The indexing disk and work supporting center 4 has an axial bore 39 therein, whereby it may be rotatably supported on the dead spindle 3 of the tailstock; and a screw 40 is threaded through said center into an annular groove 41 provided therefor in said spindle, thereby rotatably securing said center on said spindle.

The indexing disk 37 is held in the desired position of rotary adjustment by means of an arm 42 that is pivotally mounted for swinging movement across the rear face of said disk by means of a stud 43 fixed to the front end of the tailstock 2. The free upper end of the pivotal arm 42 has a pin 44 fixed thereto adapted to fit within any one of the indexing holes 38 that is brought into register therewith. The arm 42 is slidable along the supporting stud 43 so as to engage the pin 44 with and disengage it from the indexing holes 38; and a coil compression spring 45 is sleeved on said stud between the arm and the tailstock 2 for yieldably holding said arm with the pin in engagement with the selected indexing hole 38.

The work supporting and indexing tailstock center 4 is operatively connected to the work by means of a collar 46 which is clamped on the work by means of a set screw 47 and has a depending arm 48 that extends downwardly and thence horizontally into the downwardly opening notch 49a in a depending bifurcated lug 49 formed integral with said center, said arm being clamped in said notch by means of a set screw 50. By this arrangement, work may be indexed by rotating the indexing disk 37 relative to the tailstock center 4 and then locked in the desired position of rotary adjustment by engaging the pin 44 on the lock arm 42 with the indexing holes 38 in said disk.

Obviously, the hereinbefore described construction admits of considerable modification without departing from the invention. Therefore, I do not wish to be limited to the precise construction shown and described.

What I claim is:

In a lathe having a headstock and a tailstock and a carriage slidable therebetween, the combination with a milling attachment comprising an upright cylindrical tool post sustained by said carriage, a hollow cylinder sleeved on said tool post over the upper end thereof for rotary and axial sliding movement thereon and having a closed upper end, means for raising and lowering said cylinder on said post including a screw threaded downwardly through the closed upper end of said cylinder axially thereof and having a rotary but non-axially slidable connection with the upper end of said tool post, means for locking said cylinder to said post in all positions of rotary and axial adjustment thereon, said cylinder having a laterally projecting portion on one side thereof, an upright cutter shaft journaled in said laterally projecting portion of said cylinder, a cutter fixed to the lower end of said cutter shaft and adapted to engage work supported by said head and tailstock, an electric motor mounted on said laterally projecting portion of said cylinder and having a vertically disposed armature shaft, and gearing connecting the upper end of said armature shaft to the upper end of said cutter shaft.

JOSEPH C. HARBISON.

REFERENCES CITED

The following references are of record in the file of this patent:

UNITED STATES PATENTS

| Number | Name | Date |
|---|---|---|
| 1,057,005 | Miles | Mar. 25, 1913 |
| 1,108,735 | Frykman | Aug. 25, 1914 |
| 2,074,844 | Hill | Mar. 23, 1937 |
| 2,188,447 | Smith | Jan. 30, 1940 |